(12) United States Patent
Martin

(10) Patent No.: US 8,077,845 B2
(45) Date of Patent: Dec. 13, 2011

(54) REMOTE CONTROL OF A SECURITY SYSTEM USING TELEPHONE DEVICE

(75) Inventor: Christopher D. Martin, Plainview, NY (US)

(73) Assignee: Honeywell International Inc., Morristown, NJ (US)

(*) Notice: Subject to any disclaimer, the term of this patent is extended or adjusted under 35 U.S.C. 154(b) by 1203 days.

(21) Appl. No.: 11/769,342

(22) Filed: Jun. 27, 2007

(65) Prior Publication Data

US 2009/0003564 A1 Jan. 1, 2009

(51) Int. Cl.
*H04M 11/00* (2006.01)
*G06F 7/04* (2006.01)

(52) U.S. Cl. .......... 379/102.01; 379/102.06; 726/2; 726/17

(58) Field of Classification Search ........... 379/102.01, 379/102.06; 726/2, 17
See application file for complete search history.

(56) References Cited

U.S. PATENT DOCUMENTS

| | | | | |
|---|---|---|---|---|
| 5,027,383 A * | 6/1991 | Sheffer | | 379/39 |
| 5,717,378 A * | 2/1998 | Malvaso et al. | | 340/506 |
| 6,169,890 B1 * | 1/2001 | Vatanen | | 455/406 |
| 7,552,467 B2 * | 6/2009 | Lindsay | | 726/5 |
| 2003/0160681 A1 * | 8/2003 | Menard et al. | | 340/5.64 |
| 2006/0083228 A1 * | 4/2006 | Ong et al. | | 370/389 |
| 2009/0259588 A1 * | 10/2009 | Lindsay | | 705/40 |

FOREIGN PATENT DOCUMENTS

WO  WO 01/37589 A1  5/2001

* cited by examiner

*Primary Examiner* — Creighton Smith
(74) *Attorney, Agent, or Firm* — Husch Blackwell LLP

(57) ABSTRACT

System and method for remotely controlling at least one local security system from a telephone device. The system includes a reception section for receiving a telephone call, a decoding section for decoding input from a caller and a controller for receiving the information and authenticating the caller based upon the detected information. The system also includes a voice server controlled by the controller for interfacing between the system and the caller. The voice server prompts the caller for information used to authenticate the caller, reports a status of each local security system and prompts the caller to select a particular local security system to control. Furthermore, the system includes a central database that contains subscriber information separated into subscriber records. The subscriber record includes at least one subscriber identifier authorized to control each local security system. The control instruction is transmitted to a selected local security system by a transmission section.

27 Claims, 5 Drawing Sheets

REMOTE CONTROL OF A SECURITY SYSTEM USING TELEPHONE DEVICE

BACKGROUND OF THE INVENTION

1. Field of the Invention

The invention relates to a system and method for controlling a security system from a remote location. More specifically, the invention relates to remotely managing a security system from a telephone device.

2. Background

Security systems, such as for both commercial and residential use, have become commonplace as people seek to protect themselves and their property. A security system includes any life, safety, and property protection system. A typical security system includes a security device located at the commercial or residential property, a local monitoring station, and a network operation center. Both the local monitoring station and the network operation center are remotely located from the security device.

Typically, a user (or installer) subscribes or registers the security device with one central monitoring station, The user provides the local monitoring station with information regarding the property that a security device is protecting and personal information. Each user is assigned a unique account number. These account numbers are stored in a server at the local monitoring station and a network operation center.

The security device typically includes a central control panel that communicates with a number of sensors via a wired or wireless path. The control panel has the ability to notify local emergency services and/or a local monitoring station of an alarm condition via a telephone dialer to the remote monitoring facility or local emergency services. A communication network device, such as a modem, allows the control panel to send and receive information via a communication link to a communication network. The communication network can be a telephone network and the communication link is a telephone line; however, the control panel can also send and receive information via a computer network, such as the Internet or GSM. The computer network may include a DSL or cable modem, and a network interface card, for example.

The security device also includes a user interface device such as a keypad with alphanumeric keys. This keypad can be wired or wireless. Typically, the security device owner can access and control the security device using the keys on the keypad. Alternatively, the owner might have a remote control device that transmits radio frequency signals to the keypad to control the system. For example, a control device can allow the owner to arm or disarm the device by depressing on button on the control device.

Alternatively, U.S. patent application Ser. No. 11/546,865, entitled Method and System for Controlling a Security System Using Near Field Communication, assigned to Honeywell International, Inc., describes controlling a security device using a remote object by the transmission of radio frequency signals to a target device when the remote object is in close proximity to the target device. An owner is able to arm or disarm the security system by holding the remote object with near field communication capability in proximity of either the keypad or an arming and disarming station to control the security systems.

Additionally, U.S. application Ser. No. 11/451,973 entitled A Method and Apparatus for Using SMS short Code Messaging to Facilitate the Transmission of Status Update for a Security System, assigned to Honeywell International, Inc., describes a method and system that allows a user to send a request for a status update to a monitoring station from a remote device and receive status updates on the remote device. The owner or operator can send a predefined SMS message to an access server to generate a request for a remote status update. The owner can pre-register for such a service and define what information that the owner can receive. Based upon the predefined SMS message, the owner will receive the specified information. Additionally, an owner can send a specific SMS to remotely modify the status of the security device such as arming or disarming the security device.

Alternatively, Honeywell International, Inc. has developed an interactive phone module for remotely controlling the security system using a telephone device. A telephone keyset or keypad is used in the same manner as the user interface keypad installed in the owner's home or business. Using the telephone device, the owner can arm, disarm or check the status of the security system from any location. For example, VISTA 4286VIP, a product which is available from Honeywell International, Inc., is used to input a desired control command into a telephone device that is in direct communication with the local security system.

The owner or operator would directly dial a telephone number of the home or business where the security device is located and enter a phone code and user pass code followed by a telephone command.

Further, U.S. patent application Ser. No. 11/647,918 entitled Remote Control of a Security System Using E-mail describes a method and system for remotely controlling a local security system by sending an email message to a network operating center. U.S. patent application Ser. No. 11/647,918 is assigned to Honeywell International, Inc. The network center authenticates the sender and initiates a response to a control message embedded in the email.

However, each of the above-identified methods and systems are generally used to control one local security system at a time. For example, using the VISTA 4286VIP module, a user is directly dialing a particular location and accessing the local security system itself. The user can only control the local security system they dialed. However, a subscriber can have multiple local security systems. For example, a subscriber can have a system at a primary residence, another at a vacation home and yet another at a business. Furthermore, a subscriber can have a system located at multiple business locations.

Therefore, there is a need for a system and method that allows a subscriber or user to manage multiple local security systems without having to dial or email each system.

BRIEF SUMMARY OF THE INVENTION

Accordingly, disclosed is a method and system that allows a subscriber or a user to manage at least one local system security by simply placing a telephone call to a predetermined destination. The subscriber does not need to have a specialized module attached to the local security system. The disclosed system and method provides a secure manner of controlling multiple local security systems.

The method of remotely managing at least one local security system associated with a subscriber account comprises the steps of receiving a telephone call from a telephone device, authenticating a caller based upon information entered by the caller; retrieving a status for each of the at least one local security system based upon the authenticating, relaying the status for each of the at least one local security systems to the subscriber, receiving a control instruction and control passcode for a selected one of the at least one local security system, transmitting the control instruction and control passcode to the selected local security system, and executing the control instruction by the selected local security system.

The entered information includes a subscriber identification and subscriber passcode. If both the subscriber identification and subscriber passcode do not match the corresponding data in a central database, and the match is not from the same subscriber record, the caller is not allowed to control any local security system or obtain status for a local security system.

Additionally, for extra security, the caller can be identified and authenticated by information related to the telephone device, such as caller ID and ANI number. Similarly, if the caller ID/ANI does not match the corresponding data in a central database, and the match is not from the same subscriber record that matched the subscriber identification and passcode, the caller is not allowed to control any local security system or obtain status for a local security system.

The method also includes the steps of determining a number of local security systems associated with the subscriber account, assigning at least one telephone number digit to each determined local security system and prompting the subscriber to select a particular local security system from said at least one local security system to control, where each of said local security system is identified by a unique name and indicated by the at least one digit on a telephone keypad. A list of the determined number local security systems is provided to the caller.

BRIEF DESCRIPTION OF THE DRAWINGS

These and other features, benefits and advantages of the present invention will become apparent by reference to the following text and figures, with like reference numbers referring to like elements across the views, wherein.

DETAILED DESCRIPTION OF THE INVENTION

The present invention includes a method and system for allowing a user to control his local security system from a remote location by calling a network operating center and inputting a instruction after authentication of the user.

The term "user" refers to any person that has the authorization to control and access features of a local security system, for example, a home or business owner, employee, or relative. A user can be a subscriber of a local security company. A "local security system" refers to equipment installed in a residential or commercial property that detects undesired access, entry, occupation, or the presence of a hazard or the occurrences of an event within the designated space. A "Dealer" refers to a company that buys a security system from a security system manufacturer and installs the system for an end user. The dealer monitors the operating local security system. The term Automatic Number Identification (ANI) is a system utilized by telephone companies to identify the telephone number of a caller.

According to the invention, a user can pre-register subscriber identifications which are authorized to send an instruction or receive status of a local security system. The registration process will be described in detailed later.

Optionally, the user can pre-register one or more telephone identification numbers that are authorized to send an instruction or receive a status. The caller can be identified using either the subscriber identifier and passcode or an telephone identification number, a subscriber identifier, and a subscriber passcode to maintain a secure system.

The user can have two levels of security for accessing the remote control system. In one embodiment, the user can decide which level of authentication is used. In another embodiment, the dealer can choose the level of authentication.

In another embodiment, authentication can also be accomplished using voice recognition.

Figure 1:
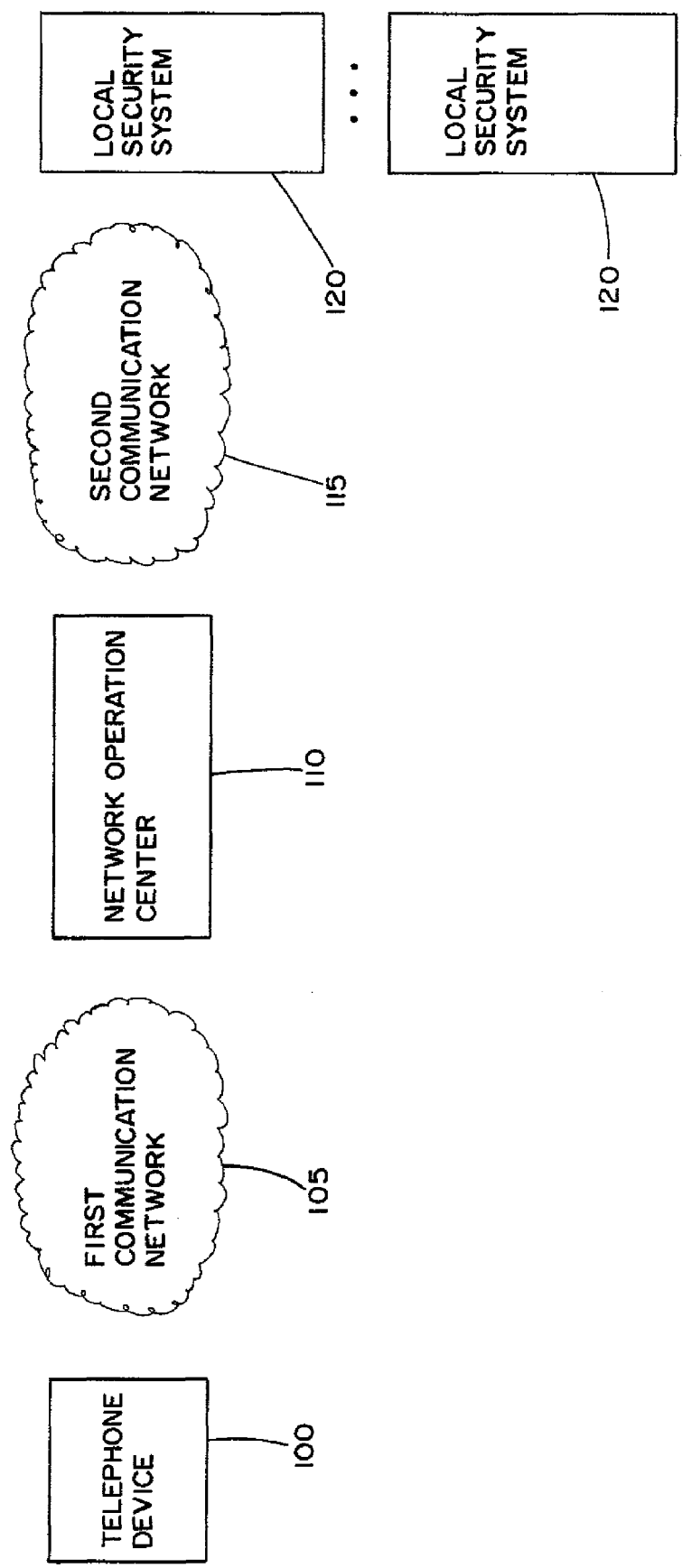
FIG. 1 is a diagram of the components of a system in accordance with an embodiment of the invention.

FIG. 1 illustrates a diagram of the control system in accordance with the invention. A user can call a predetermined number using a telephone device 100. The predetermined number is a dealer specific number that is used to call a network operation center (NOC). A telephone device 100 can be any device that is capable of making a call, such as, but not limited to, a computer, PDA, laptop, cellular telephone, cable television set top box, or a POTS telephone. The telephone device 100 will transmit a call using a first communication network 105. The first communication network 105 can be a cellular network, such as CDMA, GSM, or a PSTN network.

The NOC 110 will receive the call, identify the caller, authenticate the caller, receive a inputted control instruction, and forward the instruction to at least one local security system using a second communication network 115. The second communication network can be any communication network capable of transmitting data being two devices, such as the Internet, cellular network (GSM), PSTN, etc.

Figure 2:
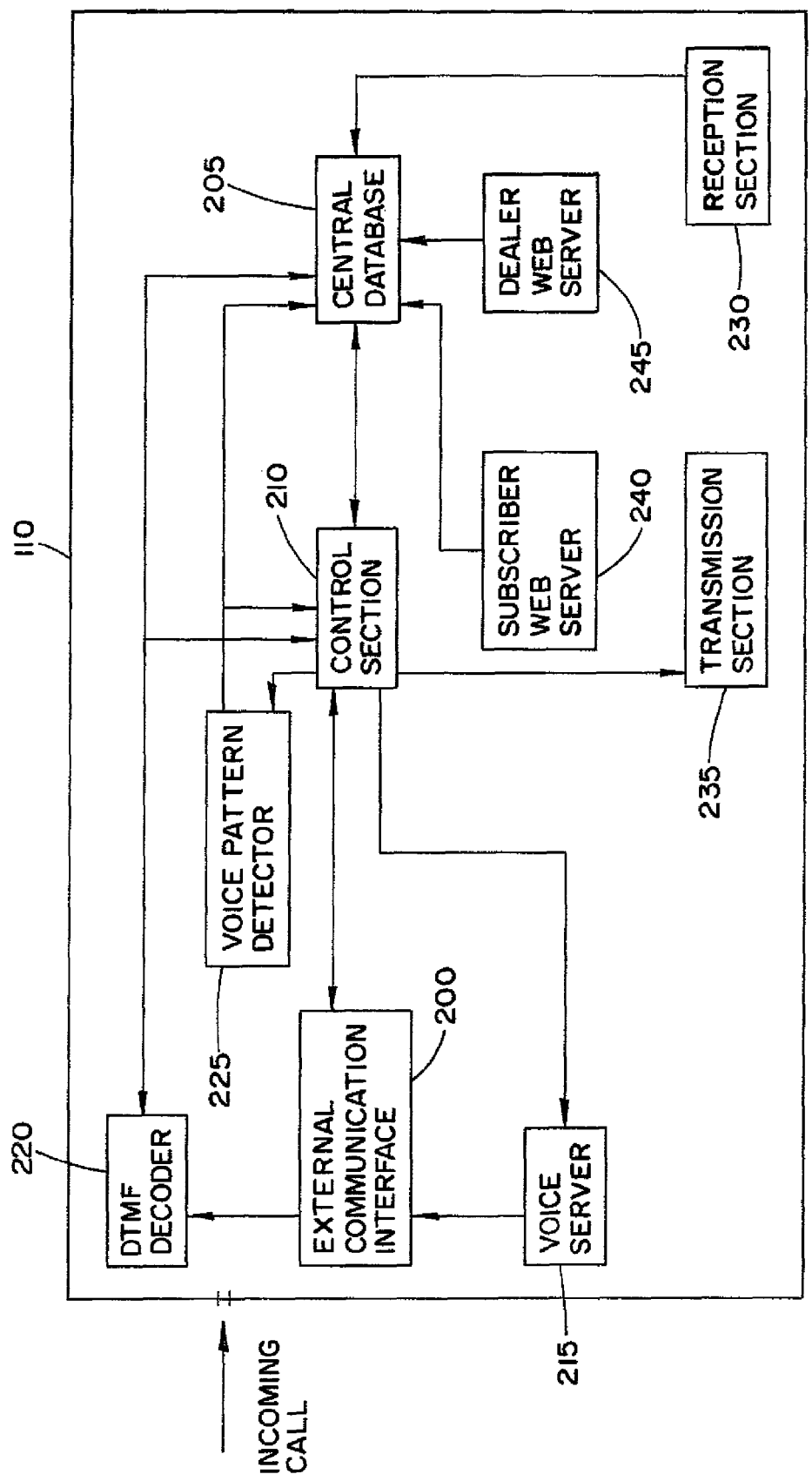
FIG. 2 illustrates a block diagram of the network operation center according to an embodiment of the invention.

FIG. 2 illustrates a block diagram of the network operation center 110 according to an embodiment of the invention.

The NOC 110 includes an external communications interface, a central database 205, a control section 210, a voice service 215, a decoding section or detecting section, such as a DTMF decoder 220 or a voice pattern detector 225, a reception section 230 and a transmission section 235. The NOC 110 also includes a subscriber web server 240 and a dealer web server 245.

The external communications interface 200 receives the telephone caller form the telephone device 100. The external communications interface 200 can be a telephone jack or a cellular antennae array.

The central database 205 includes all subscriber, user and dealer information including account numbers, telephone numbers (Caller ID/ANI) (if used), user passcodes, control passcodes, and status for each local security system. The central database also includes information used by the voice server 215. The control section 210 controls the functionality of the NOC 110. The control section identifies the caller and authorizes the caller based upon information received from the DTMF decoder 220 or a voice pattern detector 225 and information from the central database 205. The central section 210 can be a microcontroller or a FPGA.

Figure 3:
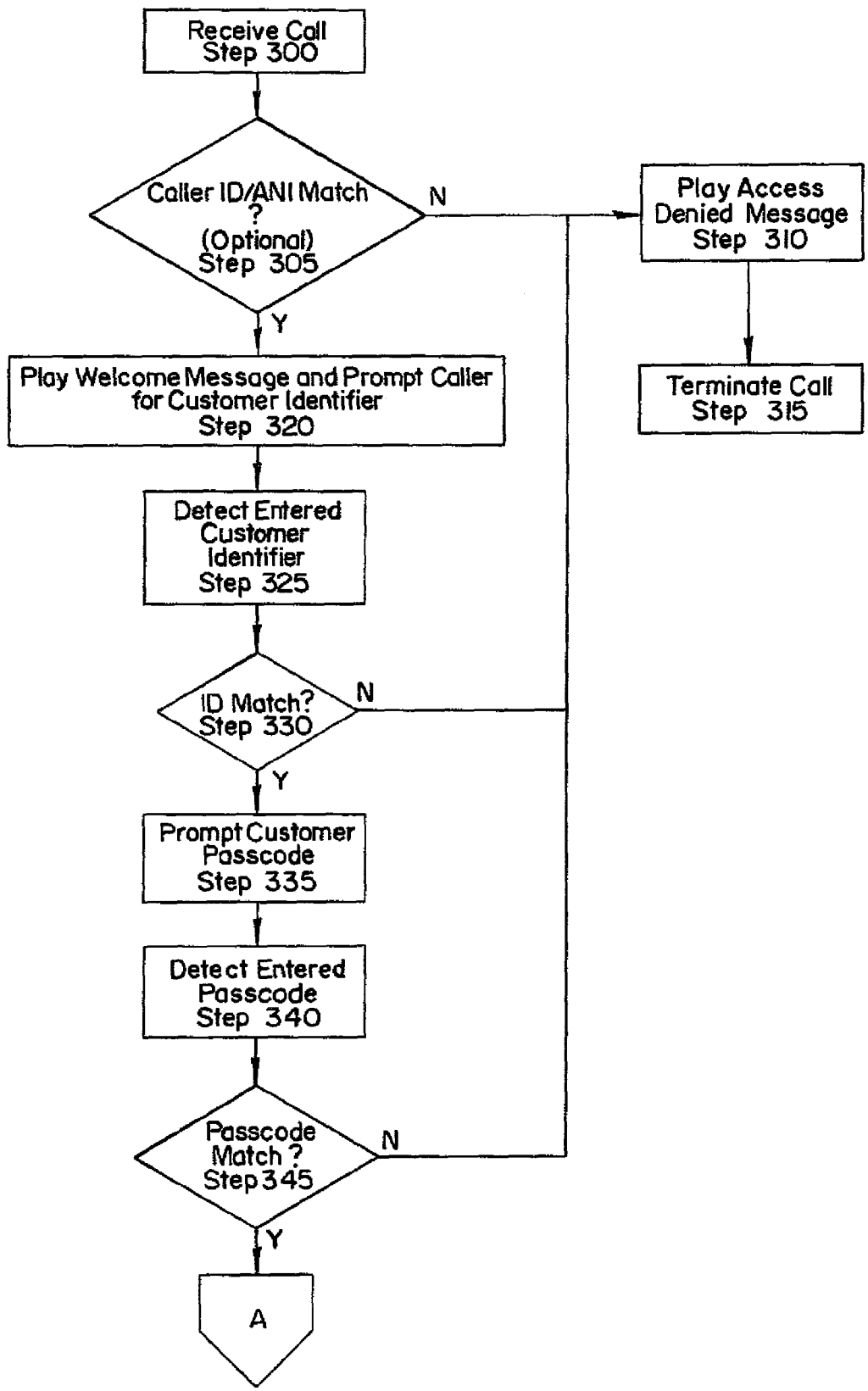
FIGS. 3-5 illustrate a flow chart of the method of remotely controlling a local security system according to a first embodiment of the invention.
Figure 4:
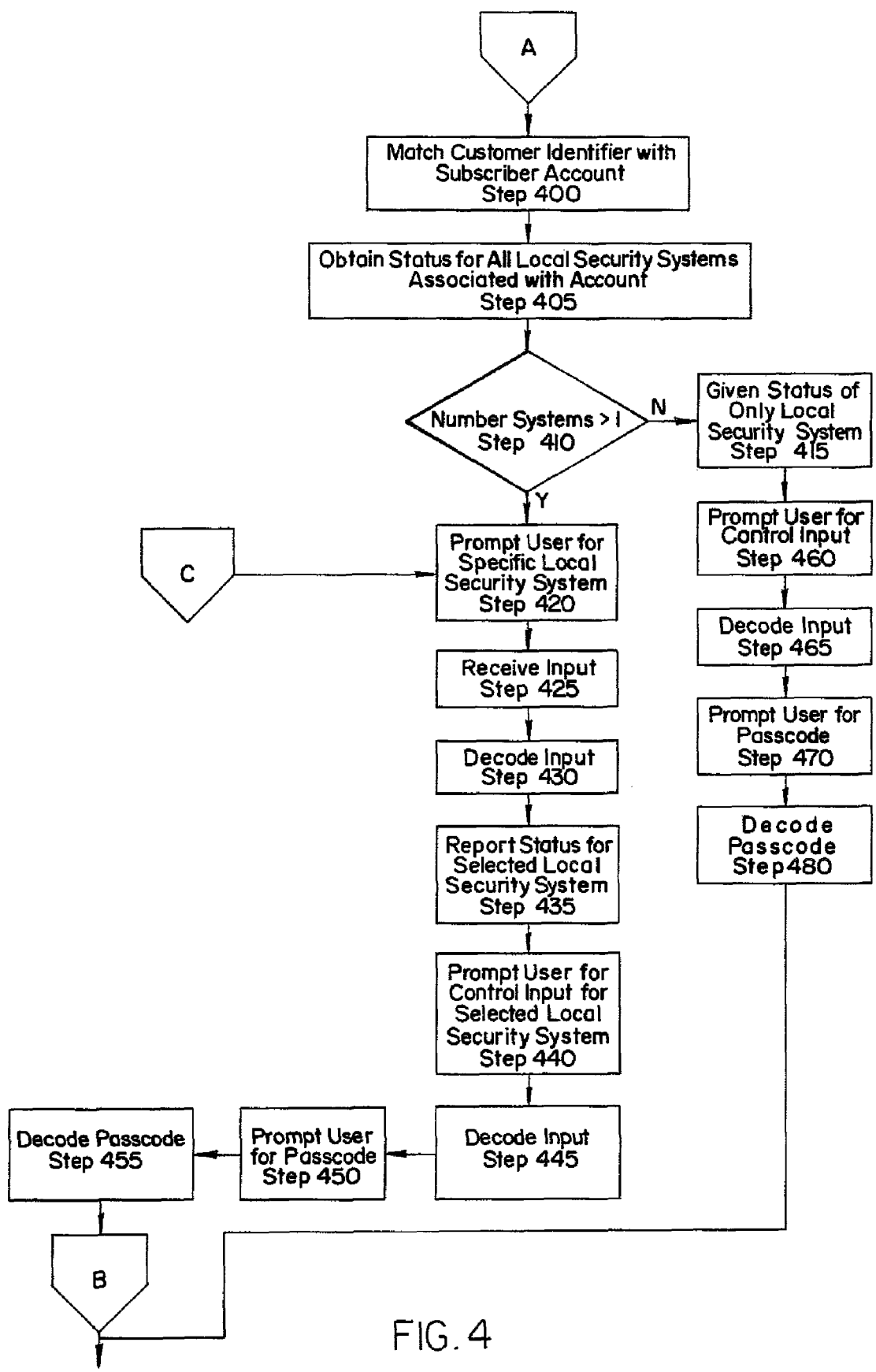
Figure 5:
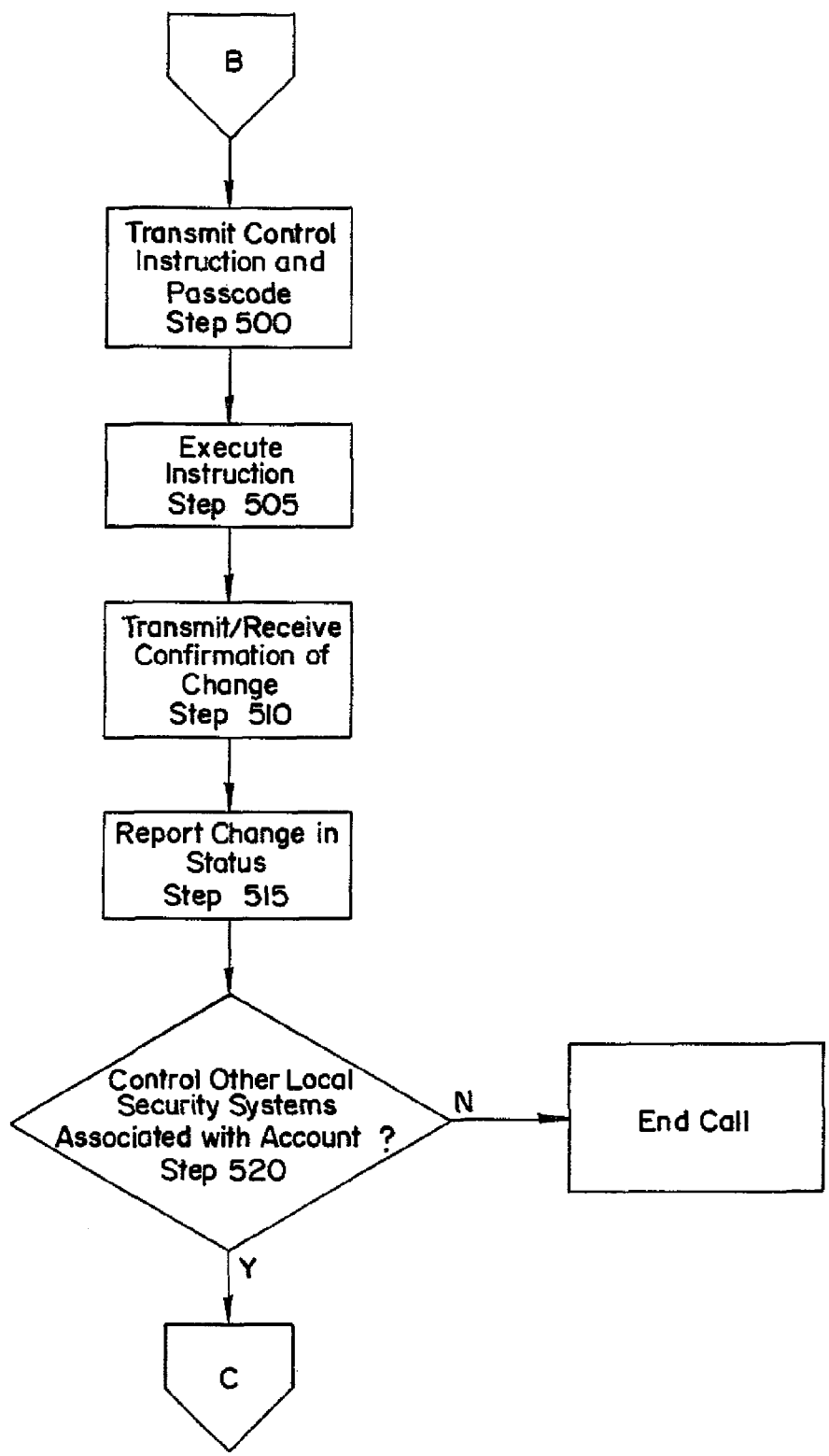

FIGS. 3-5 are flow charts illustrating the management method according to an embodiment of the invention. FIG. 3 depicts the method of identifying and authenticating a caller. As illustrated, the method uses multiple levels of identification to insure the security for the management system. The system will not allow a caller to control any local system or receive status if any of the identification criteria is not satisfied.

When a user intends to manage a local security system remotely, the user initiates a telephone call to the NOC 110. The call is placed from the telephone device 100 to a pre-assigned dealer telephone number. The dealer telephone number is a specific number assigned to a particular local dealer. The dealer number is a means for a caller to contact an NOC 110. At step 300, the external communication interface 200 receives a call from a telephone device 100. Optionally, the NOC 110 can identify the caller's telephone device using a caller ID or ANI. The ANI is detected using a standard DNIS device (dialed number identification system) included in the external communication interface 200. If the dealer or user has enabled telephone number identification, the Caller ID or ANI number is forwarded to the control section 210. The control section 210 will determine if the detected Caller ID or ANI number matches a prestored telephone number from the central database 205, at step 305. If the detected Caller ID or ANI number does not match the prestored number, an access denied message can be optionally played (Step 310) by a voice server 215, and the call will then be terminated, at step 315.

If the Caller ID or ANI number matches the prestored telephone number, the voice server 215 plays a welcome message and prompts the caller for a subscriber identifier, at step 320. If the Caller ID is blocked, i.e., unavailable, the control section 210 can deny control of the local security system. A dealer can customize the welcome message. A dealer customizes the welcome message using a dealer website maintained by a dealer web server 245. The customized dealer welcome message provides the dealer the ability to distinguish itself from other dealers having a relationship with the NOC 110.

Alternatively, if the dealer or user has not enabled the telephone number identification as part of the authentication process, the method proceeds directly to step 320.

The welcome message is a voice-synthesized message used to indicate that a caller has reached the management system for a particular dealer. The welcome message will also provide the caller with options for identifying the caller, receive status updates from a particular local security system 120, select a local security system 120 to control and input a control message.

The data is input using the telephone device 100. The data can be input using a touch-tone keypad or via a speaker into the telephone device 100.

At step 320, the voice server 215 prompts the caller to press keys that represent the subscriber identifier or speak the subscriber identifier into a speaker. The caller will input the customer identifier using the telephone device 100. The NOC 110 receives the subscriber identifier via the external communication interface 200. At step 325, the NOC 110 detects and decodes the subscriber identifier using either a DTMF decoder 220 or voice pattern detector 225. The decoded subscriber identifier is compared with a prestored subscriber identifier in a central database 205. The control section 210 searches the central database for a match. In another embodiment, the control section 210 retrieves the prestored subscriber identifier from the subscriber account record that corresponds to the matched Caller ID or ANT number, at step 330. If the decoded subscriber identifier does not match the subscriber identifier from the central database 205, the control section 210 will cause the voice server 215 to announce that access is denied, at step 310. The call will be terminated, at step 315.

If at step 330, the decoded subscriber identifier matches the subscriber identifier from the central database 205, the control section 210 will cause the voice server 215 to prompt the caller for a subscriber passcode, at step 335. The voice server 215 will instruct the caller to press keys on the button on the telephone device 100 that represent the subscriber passcode or speak the subscriber passcode into the telephone device 100. The NOC 110 receives the subscriber passcode in the same manner as the subscriber identifier, i.e., the external communication interface 200. At step 340, the NOC 110 detects and decodes the subscriber passcode using either the DTMF decoder 220 or voice pattern detector 225, depending on the manner in which the subscriber passcode was entered.

The decoded subscriber passcode is compared with a prestored subscriber passcode from the central database 205. The control section 210 retrieves the prestored subscriber passcode from a subscriber record that corresponds to the matched subscriber identifier, at step 345. If the caller ID or ANI number is used for authentication, the subscriber passcode must match the stored subscriber passcode from the subscriber record that corresponds to the matched caller ID or ANI number and subscriber identifier.

If the decoded passcode does not match the prestored passcode, the control section 210 will cause the voice server 215 to announce that access is denied, at step 310. The call will then be terminated, at step 315.

In another embodiment, if the caller enters an incorrect subscriber identifier and passcode, i.e., no match, the control section 210 can cause the voice server 215 to prompt the caller to re-enter the subscriber identifier and passcode. According to this embodiment, if the caller enters an incorrect subscriber identifier and/or passcode more than a preset number of times, the control section 210 will disconnect the call and the call will be terminated.

If the decoded passcode matches the prestored passcode, the call is authenticated and the caller's identity is known. The above authentication process ensures security of all local security systems. The NOC 110 will allow the call to proceed and the process moves to step 400.

In another embodiment of the invention, voice identification and recognition can be used to authenticate a caller. A digital recording of the caller's voice will be stored in the central database. When the caller calls the NOC 110, the voice pattern detector 225 matches the voice from the caller with the stored digital recording. The voice identification provides another level of security and authentication.

At step 400, the control section 210 will retrieve the subscriber record that corresponds to the caller's subscriber identifier and passcode from the central database 205. The control section 210 accesses the status for all local security systems associated with the subscriber record, at step 405.

A subscriber record can have multiple local security systems associated with the record, e.g., a primary home and a summer home security system. The control section 210 retrieves the status of all local security systems. Each security system is identified by a name and at least one telephone keypad digit. The selection of the local security system will end with an "end" indicator such as "#".

For example, a primary home can be identified as "home 1", a summer home can be identified as "summer 2". Alternatively, the address can be used instead of a name such as "1234 High Street 1".

At step 410, the control section determines the number of local security systems associated with the subscriber record.

If there is only one local security system, the control section 210 causes the voice server 215 to announce the status for the local security system, at step 415.

The voice server 215 prompts the caller to enter a control instruction using the telephone device 100. The voice server 215 instructs the caller to press or speak a special present number for a given function. For example, "press or say 2 to arm away", or "press or say 3 to arm stay."

The caller enters the control instruction using a telephone device, e.g., keypad or microphone. The NOC 110 receives the control instruction via the external communication interface 200 and decoder, the input at step 465. Depending on the input, the NOC 110 will use either a DTMF decoder 220 or voice pattern detector 225. The control section 210 then instructs the voice server 215 to prompt the caller for a control passcode, at step 470. The control passcode is the same passcode used to control the local security system 120 when using the standard keypad. For example, the announcement could be "enter your security passcode now." The passcode is a 4-digit code. The caller will enter the passcode using the keypad on the telephone device 100 or speak the passcode into the telephone device. The NOC 110 receives the passcode and decodes the passcode in the same manner as described above for the control instruction.

Once the control instruction is forwarded to the control section 210 and decoded in the central database 205, the instruction is then sent to the appropriate local security system 120 in a manner that will be described later.

If at step 410, the control section 210 determines that there are multiple local security systems 120 associated with the subscriber record, the voice server 215 will instruct the caller to select a local security system to receive status for a control, at step 420. The caller is provided a list of all local security systems 120 associated with the subscriber account. The list will be presented as voice data by the voice server 215. Each local security system is preassigned at least one digit on the telephone device. For example, if there are nine systems, the caller will be given the option to press or say 1 through 9, "1" indicating the local security system 1, "2" indicating local security system 2 . . . . A tenth local security system 120 can be assigned or labeled as "10".

The caller enters the selected local security system by pressing the digit or saying the at least one digit that corresponds to the desired local security system 120.

The NOC 110 decodes the input data, at step 430 using either the DTMF decoder or voice pattern 215.

The control section 210 receives the decoded selection and reports the status of the selected local security system at step 435. After the status is reported, the NOC prompts the user for control input. Steps 435-455 are performed in the same manner as step 415, 460, 465, 470 and 480, respectively, and will not be described again.

Once the control instruction and passcode are decoded, the instruction is stored in the central database 205 and forwarded to the central section 210. Afterwards, the instruction and passcode are sent to the selected local security system 120.

The instruction and/or passcode will be transmitted to the local security system 120 using a second Communication Network 115, at step 500. In one embodiment, the second communication network is the Internet. The Internet connection between the local security system 120 and the NOC 110 can be used for reliable secure communications. The instruction and/or passcode is transmitted to the local security system 120 using the transmission section 235.

Prior to transmission of the instruction and/or passcode, the control section 210 will encrypt the data. The control instruction or message can be transmitted from the NOC 120 using a known transmission method such as AlannNet, which is operated by Ademco, (a brand of Honeywell International, Inc. AlarmNet—A communications network operated by Ademco that uses Internet, Cellular, GSM, Mobitext, and other proprietary technologies. The network is used to upload and download alarm system configuration and operational data as well as act as a pathway for alarm system based events to be routed from the protected premises to an NOC 110.

For example, the second Communication Network 115 can be the Internet. In order to avoid a firewall, the NOC 110 will wait for the local security system 120 to initiate contact with the NOC 110 periodically. Once a session is open, the NOC 110 will send the data to the local security system 120. The NOC 110 can use an AlarmNet-I communications network to transmit the encrypted instruction data. AlarmNet-I is a proprietary communication network operated by Honeywell International, Inc., which uses the Internet. The network is used to upload and download alarm system configurations and operational data. In this example, the transmission section 215 in the NOC 110 will be an AlarmNet-I transmitter to the Internet and received by an AlarmNet-I receiver at the local security system 120. Alternatively, the NOC 110 can use an Ethernet-based transmitter to send the instruction over the Internet. Another alternative is that the NOC 110 can use a modem device, such as the transmission section 215, to transmit the instruction over the Internet.

In another embodiment, the NOC 110 can transmit the instruction to the local security system 120 using a cellular network such as AMPS or GPRS. For example, the NOC 110 can include as the transmission section 215, a cellular antenna, e.g., an AlarmNet C transmitter or GPRS transmitter. AlarmNet-C (now AlarmNet-G for GSM) is a proprietary communication network operated by Ademco (a brand of Honeywell International, Inc.) that uses cellular communication network carriers. The AlarmNet C transmitter will route the instruction using the AlarmNet-C communication network.

In another embodiment, the NOC 110 can transmit the instruction to the local security system 120 using a standard telephone network using analog tones, frequency-shift keying or other tone patterns.

The control instruction can be any instruction to modify a feature of the local security system 120, including, but not limited to arm-stay, arm-away, and disarm.

At step 505, the local security system 120 receives the control instruction and passcode. The control panel for the local security system 120 will execute the instruction. The instruction and passcode will appear to the control panel as if it were received from the local keypad. For example, if the control panel receives an instruction to disarm the system, the control panel will cause the local security system to disarm. The feature can be particularly useful if a user is carrying something and cannot depress the keypad. Additionally, the remote feature is important if a user forgot to arm the local security system 120.

Once the instruction is executed, the control panel sends a confirmation that the instruction is executed, at step 510. The confirmation is transmitted via the second communications network 115. The confirmation messages are received by the NOC 110 and stored in the central database indexed by the subscriber record. Additionally, the NOC will report the confirmation and change of status of the local security system to the caller, at step 515, using the voice server 215.

If there are more than one local security system 120 associated with the subscriber record, the NOC 110 will ask the caller if the caller wants to control any other local security system, at step 520. If the caller wants to control or obtain status for another security system, the process returns to step 420, otherwise the call is ended.

Each time a user calls the NOC 110 to control a local security system 120 or receive status; the NOC 110 maintains a history log or register of the call. The history log includes, the time of the call, caller ID, information access, control instruction entered, and identification of the local security system controlled. The history log can be viewed by a subscriber using a subscriber website. In another embodiment, the history log can be accessed over the telephone.

As described above, a subscriber to security system can register for the remote control system using a website maintained and managed by a subscriber web server 240 in the NOC 110. Using the website, a subscriber can create a control account in the central database 205. This account will be accessed by the control section 210 each time a user calls the NOC 110. The account is created using a computer or any device that is capable of connecting to the Internet using a standard web browser. The subscriber logs into the website using a passcode and login name provided by a security system installer The website is exposed to the Internet via a public IP address. Information entered onto the website is received by the subscriber web server 240 and stored as a data record in the central database 205.

The user will enter the personal subscriber information into each field entry. The personal subscriber information can include a name, billing address, accounting number, and the address of the protected premises. To activate the remote control feature, the user can enter at least one subscriber identifier from which the system is authorized to accept a call. The subscriber can enter more than one identifier. Optionally, the user can enter at least one telephone number from which the system is authorized to accept a call.

In another embodiment, if voice identification is used, the user can call a predetermined telephone number and input a voice sample. The dealer will assign the telephone number to the user. This number is different from the number that a user uses to call the NOC 110, e.g., control local security system or receive status. The user will be prompted to input the voice sample by a voice server or a digital menu. The user can record the voice sample or change an existing voice sample. More than one different voice sample can be entered, i.e., more than one person. The voice sample will be digitized and stored in the central database 205 indexed by subscriber record.

Additionally, in an embodiment, the subscriber can set an authorization schedule for each telephone number. For example, if the subscriber enters multiple numbers, e.g., a business number and a cellular telephone number, the subscriber can only authorize calls from the work telephone number during business hours.

Additionally, in an embodiment the subscriber can assign certain control rights to each telephone number. One telephone number can have complete control authority. A second number might only be able to arm the local security system 120 without being able to disarm the system. Accordingly, each authorized caller or telephone number can have different control levels or authority. For example, a security officer in a commercial building can have the highest level of authority, i.e., complete control of all functions. An employee might only be able to arm or disarm the security system. Using the website, the subscriber can program each function or feature for an authorized caller. Alternatively, the subscriber can program a function or feature that an authorized caller cannot control.

Further, in another embodiment, the subscriber can set a period for which the caller has control authority, e.g., a predetermined time period, and after such a period expires, the caller would no longer have any control authority. The feature provides several advantages. For example, an employer can control access to the security system based simply on using an expiring call period. This is particularly useful if there is a high turnover in employment. For example, the e-mail authority can be renewed automatically every Monday.

Once all of the desired control and authority fields are entered into the website, the subscriber web server 240 will forward all of the information to the central database 205 for storage as a data record. The system will then assign a dealer telephone number to call.

Depending on the limitation entered, e.g., date, time, instruction, the control section 210 determines whether the limitation is meet or not, at a different stage of the process. For example, if the limitation is a date or time, the control section 210 performs the determination after the caller ID or ANI number is detected, i.e., after step 305. The control section 210 uses its internal clock for timing and compares the time that the telephone call was received to a prestored limiting time or period, if any. In other words, even if the caller's caller ID or ANI matches, if the authorization has expired for the telephone number or if the call is received out of the scheduled time, access is denied and the call is terminated. This determination will be repeated once the caller enters a specific local security system, i.e., after step 420. The time is based upon the local time of the subscriber, i.e., location of the security system. Therefore, before storing the times, the NOC 110 will convert the entered time into an NOC local time.

If the limitation is based upon the input control instruction, the control section 210 determines whether the limitation is met after the caller inputs the intended control instruction, i.e., after steps 445 and 460. The control section compares the input control instruction with any limitation in control stored in the central database for the particular local security system. If the input instruction is prohibited, the voice server 215 informs the caller that access was denied.

Each local security system associated with a subscriber account or subscriber record can have different limitations on the caller.

Similarly, a dealer can customize its dealer parameters using a dealer website maintained by a dealer web server. Dealer parameters include new subscriber accounts, new features available, and a dealer specific welcome message for the remote access system. The dealer accesses the website in the same manner as the subscriber website, i.e., using the Internet. Once the data is entered into the dealer web server, the data is stored in the central database 205.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method of remotely managing at least one security system associated with a subscriber account comprising the steps of:
   a) receiving a telephone call from a telephone device;
   b) authenticating a caller based on information entered by a caller;
   c) retrieving a status for each of said at least one security system based upon said authenticating;
   d) relaying said status for each of said at least one security system to the telephone device;
   e) receiving a control instruction and control passcode from the telephone device for a selected one of said at least one security system;
   f) transmitting the control instruction and control passcode to the selected security system; and
   g) executing the control instruction.

2. The method according to claim 1, wherein steps (e)-(g) are repeated for each of said at least one security system associated with a subscriber account.

3. The method according to claim 1, further comprising the step of authenticating the caller based on information regarding the telephone device.

4. The method according to claim 1, wherein said information regarding the telephone device is either a caller ID or ANI number and authenticating the caller based on information regarding the telephone device includes comparing the caller ID or ANI number detected from the telephone call with a list of caller IDs or ANI numbers stored in a subscriber database.

5. The method according to claim 4, wherein a subscriber identifier is compared with a stored subscriber identifier associated with said telephone device and said subscriber passcode is compared with a stored subscriber passcode associated with a subscriber account that corresponds to a matched subscriber identifier.

6. The method according to claim 4, wherein said telephone call is allowed to proceed past the authenticating steps if said caller ID or ANI number matches a prestored caller ID or ANI number, a subscriber identifier matches a stored identifier and a subscriber passcode matches a stored subscriber passcode and all of the stored matched information is contained in the same subscriber account.

7. The method according to claim 1, wherein the subscriber account contains a plurality of security systems, where each of said plurality of security systems are located at different locations.

8. The method according to claim 1, further comprising:
determining a number of said at least one security system associated with the subscriber account;
assigning at least one a telephone number digit to each determined security system; and
prompting the subscriber to select a particular security system from said at least one security system to control, where each of said security system is identified by a unique name and indicated by the at least one digit on a telephone keypad said prompting including a list of the determined number local security systems.

9. The method according to claim 1, further comprising the steps of:
transmitting a confirmation from said selected security system; and
relaying the confirmation to said caller.

10. The method according to claim 1, further comprising the step of authorizing the control authority for the caller for the selected security system based upon at least one authorization criterion.

11. The method according to claim 10, wherein said at least one authorization criterion is different for each of the at least one security system.

12. The method according to claim 11, wherein at least one authorization criterion is a time of day in which said call is received.

13. The method according to claim 11, wherein said at least one authorization criterion is an entered control instruction.

14. The method according to claim 1, further comprising the step of assigning a dealer specific telephone number used by a caller to access said at least one security system using said telephone device.

15. The method according to claim 1, farther comprising the steps of:
maintaining a website that is accessible to a subscriber or dealer, said website adapted for receiving at least one subscriber identifier that the subscriber authorizes to receive control instructions from; and
storing the at least one subscriber identifier number in a central database in a subscriber record.

16. The method according to claim 15, wherein the subscriber record is modified by a dealer.

17. A network operation center (NOC) comprising:
a reception section for receiving a telephone call from a caller, said caller intending to control at least one security system associated with a subscriber account;
a decoding section for decoding input from a caller using a telephone device;
a controller for receiving decoded information and authenticating the caller based upon detected information;
a voice server controlled by the controller for interfacing between the NOC and the caller, the voice server prompting the caller for information used to authenticate the caller, reporting a status of each of said at least one security system and prompting the caller to select a particular security system to control and input a control instruction;
a central database including subscriber information separated into subscriber records, the subscriber records including at least one subscriber identifier authorized to control each of said at least one security system, the subscriber record also including the status of each of said at least one security system, the voice server and control section are adopted to access the subscriber information from the central database; and
a transmission section for transmitting a control instruction to a selected security system.

18. The NOC of claim 17, further comprising a reception section for receiving a confirmation signal from the selected security system indicating the execution of the control instruction.

19. The NOC of claim 18, wherein the voice server relays the confirmation signal to the caller.

20. The NOC of claim 17, wherein the decoding section is a DTMF decoder.

21. The NOC of claim 17, wherein the decoding section is a voice pattern recognition unit.

22. The NOC of claim 18, further comprising a subscriber web server that maintains a subscriber website that is accessible to a subscriber, the website adapted for receiving at least one subscriber record that the subscriber authorizes to send control instructions, the web server forwards all received information to the central database.

23. The method according to claim 1, wherein said entered information is a subscriber identifier and a subscriber passcode.

24. The method according to claim 23, wherein the subscriber identifier is compared with a stored subscriber identifier and said subscriber passcode is compared with a stored subscriber passcode associated with a subscriber account that corresponds to the matched subscriber identifier.

25. The method according to claim 24, wherein said telephone call is allowed to proceed past the authenticating steps if said subscriber identifier matches the stored identifier and the subscriber passcode matches the stored subscriber passcode and the matched information is contained in the same subscriber account.

26. The method according to claim 1, further comprising the step of authentication a caller based upon voice identification.

27. The method according to claim 1, further comprising the step of maintaining a history log of caller access, including the time of call, subscriber number, information accessed and control instruction.

* * * * *